US010134297B2

(12) United States Patent
Beigman Klebanov et al.

(10) Patent No.: US 10,134,297 B2
(45) Date of Patent: Nov. 20, 2018

(54) SYSTEMS AND METHODS FOR DETERMINING TEXT COMPLEXITY

(71) Applicant: Educational Testing Service, Princeton, NJ (US)

(72) Inventors: Beata Beigman Klebanov, Hamilton, NJ (US); Michael Flor, Lawrenceville, NJ (US)

(73) Assignee: Educational Testing Service, Princeton, NJ (US)

( * ) Notice: Subject to any disclaimer, the term of this patent is extended or adjusted under 35 U.S.C. 154(b) by 104 days.

(21) Appl. No.: 14/181,012

(22) Filed: Feb. 14, 2014

(65) Prior Publication Data

US 2014/0234810 A1   Aug. 21, 2014

Related U.S. Application Data

(60) Provisional application No. 61/765,113, filed on Feb. 15, 2013, provisional application No. 61/774,662, (Continued)

(51) Int. Cl.
*G09B 17/00* (2006.01)
*G09B 7/00* (2006.01)
(Continued)

(52) U.S. Cl.
CPC ............ *G09B 7/02* (2013.01); *G06F 17/271* (2013.01); *G06F 17/274* (2013.01); *G06F 17/2705* (2013.01); *G06F 17/2735* (2013.01); *G06F 17/2795* (2013.01); *G09B 5/065* (2013.01); *G09B 5/00* (2013.01); *G09B 7/00* (2013.01); *G09B 17/003* (2013.01); *G09B 17/04* (2013.01)

(58) Field of Classification Search
CPC .. G06F 17/2735; G06F 17/274; G06F 17/271; G09B 5/00; G09B 5/065; G09B 7/00; G09B 17/00; G09B 17/003; G09B 17/04
USPC ......................................................... 434/156
See application file for complete search history.

(56) References Cited

U.S. PATENT DOCUMENTS 5,715,468 A * 2/1998 Budzinski ............... G06F 17/27
704/9
6,298,174 B1 * 10/2001 Lantrip ............. G06F 17/30716
707/999.001
(Continued)

OTHER PUBLICATIONS

Hiebert, Elfrieda; Readability and the Common Core's Staircase of Text Complexity; TextProject, Inc.; Santa Cruz, CA; 2012.
(Continued)

*Primary Examiner* — Nikolai A Gishnock
(74) *Attorney, Agent, or Firm* — Jones Day

(57) ABSTRACT

Computer-implemented systems and methods are provided for determining a document's complexity. For example, a computer performing the complexity analysis can receive a document. The computer can determine the content words within the document and determine an association measure for each group of content words. An association profile can be created for the document using the association measures. The computer can use the association profile to determine the complexity of the document. The complexity of the document may correspond to the document's suitable reading level or, if the document is an essay, an essay score.

20 Claims, 9 Drawing Sheets

Related U.S. Application Data filed on Mar. 8, 2013, provisional application No. 61/839,537, filed on Jun. 26, 2013.

(51) Int. Cl.

| G06F 17/00 | (2006.01) |
|---|---|
| G09B 7/02 | (2006.01) |
| G06F 17/27 | (2006.01) |
| G09B 5/06 | (2006.01) |
| G09B 17/04 | (2006.01) |
| G09B 5/00 | (2006.01) |

(56) References Cited

U.S. PATENT DOCUMENTS

| 6,584,220 | B2* | 6/2003 | Lantrip | G06F 17/30716 707/999.002 |
|---|---|---|---|---|
| 6,869,287 | B1* | 3/2005 | Tadlock | G09B 17/00 434/178 |
| 7,113,958 | B1* | 9/2006 | Lantrip | G06F 17/30716 707/999.102 |
| 7,386,453 | B2* | 6/2008 | Polanyi | G09B 17/003 434/167 |
| 7,464,023 | B2* | 12/2008 | Parry | G06F 17/2705 704/9 |
| 7,464,086 | B2* | 12/2008 | Black | G06Q 30/02 707/999.005 |
| 7,516,146 | B2* | 4/2009 | Robertson | G06F 17/30699 707/999.102 |
| 7,555,496 | B1* | 6/2009 | Lantrip | G06F 17/30716 707/999.102 |
| 7,873,509 | B1* | 1/2011 | Budzinski | G06F 17/27 704/9 |
| 7,958,136 | B1* | 6/2011 | Curtis | G06F 17/30616 707/705 |
| 8,095,559 | B2* | 1/2012 | Robertson | G06F 17/30699 707/736 |
| 8,265,925 | B2* | 9/2012 | Aarskog | G06F 17/271 707/706 |
| 8,463,593 | B2* | 6/2013 | Pell | G06F 17/2785 704/9 |
| 8,517,738 | B2* | 8/2013 | Sheehan | G09B 17/003 434/156 |
| 8,744,855 | B1* | 6/2014 | Rausch | G06F 17/27 434/156 |
| 2005/0120011 | A1* | 6/2005 | Dehlinger | G06F 17/2705 |
| 2009/0197225 | A1* | 8/2009 | Sheehan | G09B 17/003 434/169 |
| 2011/0238670 | A1* | 9/2011 | Mercuri | G06F 17/30867 707/748 |
| 2014/0229164 | A1* | 8/2014 | Martens | G06F 17/241 704/9 |
| 2014/0234810 | A1* | 8/2014 | Flor | G09B 7/02 434/169 |
| 2016/0063879 | A1* | 3/2016 | Vanderwende | G09B 7/00 434/322 |

OTHER PUBLICATIONS

Hoey, Michael; Patterns in Lexis in Text; Oxford University Press; 1991.
Kincaid, J. Peter, Fishburne, Robert, Rogers, Richard, Chissom, Brad; Derivation of New Readability Formulas for Navy Enlisted Personnel; Research Branch Report 8-75, Naval Air Station Memphis; 1975.
Landauer, Thomas, Dumais, Susan; A Solution to Plato's Problem: The Latent Semantic Analysis Theory of Acquisition, Induction, and Representation of Knowledge; Psychological Review, 104(2); pp. 211-240; 1997.
Lee, Michael, Pincombe, Brandon, Welsh, Matthew; An Empirical Evaluation of Models of Text Document Similarity; Proceedings of the 27th Annual Conference of the Cognitive Science Society; Erlbaum: Mahwah, NJ; pp. 1254-1259; 2005.
Manning, Christopher, Schutze, Hinrich; Foundations of Statistical Natural Language Processing; MIT Press: Cambridge, MA; 1999.
Marathe, Meghana, Hirst, Graeme; Lexical Chains Using Distributional Measures of Concept Distance; Computational Linguistics and Intelligent Text Processing, 6008; pp. 291-302; 2010.
McLaughlin, G. Harry; Smog Grading—A New Readability Formula; Journal of Reading, 12(8); pp. 639-646; 1969.
McNamara, Danielle, Louwerse, Max, McCarthy, Philip, Graesser, Arthur; Coh-Metrix: Capturing Linguistic Features of Cohesion; Discourse Processes, 47; pp. 292-330; 2010.
McNamara, Danielle, Cai, Zhiqiang, Louwerse, Max; Optimizing LSA Measures of Cohesion; In T. Landauer, D. McNamara, S. Dennis & W. Kintsch (Eds.), Handbook of Latent Semantic Analysis; Erlbaum: Mahwah, NJ; pp. 379-400; 2007.
McNemar, Quinn; Psychological Statistics; John Wiley & Sons: New York, NY; 1955.
Mitchell, Jeff, Lapata, Mirella; Vector-based Models of Semantic Composition; In Proceedings of the 46th Annual Meeting of the Association for Computational Linguistics, Columbus, OH; pp. 236-244; 2008.
Mohammad, Saif, Hirst, Graeme; Distributional Measures of Concept-Distance: A Task-oriented Evaluation; Proceedings of the 2006 Conference on Empirical Methods in Natural Language Processing; pp. 35-43; 2006.
Morris, Jane, Hirst, Graeme; Lexical Cohesion Computed by Thesaural Relations as an Indicator of the Structure of Text; Computational Linguistics, 17(1); pp. 21-48; 1991.
Morris, Jane, Hirst, Graeme; The Subjectivity of Lexical Cohesion in Text; Ch. 5 in J. Shanahan, Y. Qu & J. Wiebe (Eds.), Computing Attitude and Affect in Text; Springer: Dordrecht, The Netherlands; pp. 41-48; 2005.
Morris, Jane, Hirst, Graeme; Non-Classical Lexical Semantic Relations; In Proceedings of the Computational Lexical Semantics Workshop at HLT-NAACL 2004; 2004.
Nelson, Jessica, Perfetti, Charles, Liben, David, Liben, Meredith; Measures of Text Difficulty: Testing Their Predictive Value for Grade Levels and Student Performance; Student Achievement Partners; 2012.
Pecina, Pavel; Lexical Association Measures adn Collocation Extraction; Language Resources and Evaluation, 44; pp. 137-158; 2010.
Petersen, Sarah, Ostendorf, Mari; A Machine Learning Approach to Reading Level Assessment; Computer Speech and Language, 23; pp. 89-106; 2009.
Pitler, Emily, Nenkova, Ani; Revisiting Readability: A Unified Framework for Predicting Text Quality; In Proceedings of the 2008 Conference on Empirical Methods in Natural Language Processing; pp. 186-195; 2008.
Quinn, Kevin, Monroe, Burt, Colaresi, Michael, Crespin, Michael, Radev, Dragomir; How to Analyze Political Attention with Minimal Assumptions and Costs; American Journal of Political Science, 54(1); pp. 229-247; 2010.
Renkema, Jan; Introduction to Discourse Studies; John Benjamins Publishing Company: Philadelphia, PA; 2004.
Schulte Im Walde, Sabine, Melinger, Alissa; An In-Depth Look Into the Co-Occurence Distribution of Semantic Associates; Rivista di Linguistica, 20(1); pp. 89-128; 2008.
Shanahan, Timothy, Fisher, Douglas, Frey, Nancy; The Challenge of Challenging Text; Educational Leadership, 69(6); pp. 58-62; 2012.
Sheehan, Kathleen; Measuring Cohesion: An Approach That Accounts for Differences in the Degree of Integration Challenge Presented by Different Types of Sentences; Educational Measurement: Issues and Practice, 32(4); pp. 28-37; 2013.
Sheehan, Kathleen, Kostin, Irene, Napolitano, Diane, Flor, Michael; TextEvaluator Tool: Helping Teachers and Test Developers Select Texts for Use in Instruction and Assessment; The Elementary School Journal, 115(2) pp. 184-209; 2014.
Sheehan, Kathleen, Kostin, Irene, Futagi, Yoko; When Do Standard Approaches for Measuring Vocabulary Difficulty, Syntactic Complexity and Referential Cohesion Yield Biased Estimates of Text Difficulty?; Proceedings of the 30th Annual Conference of the Cognitive Science Society, Washington, DC; 2008.

(56) References Cited

OTHER PUBLICATIONS

Sheehan, Kathleen, Kostin, Irene, Futagi, Yoko, Flor, Michael; Generating Automated Text Complexity Classifications That are Aligned With Targeted Text Complexity Standards; Educational Testing Service, Research Report RR-10-28; 2010.
Sheehan, Kathleen, Kostin, Irene, Futagi, Yoko; SourceFinder: A Construct-Driven Approach for Locating Appropriately Targeted Reading Comprehension Source Texts; Proceedings of the 2007 Workshop of the International Speech Communication Association, Farmington, PA; 2007.
Silber, H. Gregory, McCoy, Kathleen; Efficiently Computed Lexical Chains as an Intermediate Representation for Automatic Text Summarization; Computational Linguistics, 28(4); pp. 487-496; 2002.
Sinclair, John; Corpus, Concordance, Collocation; Oxford University Press: Oxford, UK; 1991.
Smith, E., Senter, R.; Automated Readability Index; Aerospace Medical Research Laboratories, Report No. AMRL-TR-66-220; Wright-Patterson Air Force Base; 1967.
Stajner, Sanja, Evans, Richard, Orasan, Constantin, Mitkov, Ruslan; What Can Readability Measures Really Tell Us About Text Complexity?; Proceedings of Workshop on Natural Language Processing for Improving Textual Accessibility; pp. 14-22; 2012.
Steyvers, Mark, Tenenbaum, Joshua; The Large-Scale Structure of Semantic Networks: Statistical Analyses and a Model of Semantic Growth; Cognitive Science, 29; pp. 41-78; 2005.
Stokes, Nicola, Carthy, Joe, Smeaton, Alan; SeLeCT: A Lexical Cohesion Based News Story Segmentation System; Journal of AI Communications, 17(1); pp. 3-12; 2005.
Tanskanen, Sanna-Kaisa; Collaborating Towards Coherence: Lexical Cohesion in English Discourse; John Benjamins Publishing Company: Philadelphia, PA; 2006.
Taylor, Mildred; Roll of Thunder, Hear My Cry; Phyllis Fogelman Books: New York, NY; 1976.
Turney, Peter, Pantel, Patrick; From Frequency to Meaning: Vector Space Models of Semantics; Journal of Artificial Intelligence Research, 37; pp. 141-188; 2010.
Turney, Peter; Mining the Web for Synonyms: PMI-IR versus LSA on TOEFL; Proceedings of the 12th European Conference on Machine Learning; pp. 491-502; 2001.
Vajjala, Sowmya, Meurers, Detmar; On Improving the Accuracy of Readability Classification Using Insights from Second Language Acquisition; Proceedings in the 7th Workshop on the Innovative Use of NLP for Building Educational Applications; pp. 163-173; 2012.
Yang, Dongqiang, Powers, David; Word Sense Disambiguation Using Lexical Cohesion in the Context; Proceedings of COLING/ACL 2006, Main Conference, Sydney, Australia; pp. 929-936; Jul. 2006.
Zhang, Ziqi, Gentile, Anna Lisa, Ciravegna, Fabio; Recent Advances in Methods of Lexical Semantic Relatedness—A Survey; Natural Language Engineering, 19(4); pp. 411-479; 2012.
Anderson, Richard, Davison, Alice; Conceptual and Empirical Bases of Readability Formulas; Technical Report No. 392, Center for the Study of Reading, University of Illinois at Urbana-Champaign; 1986.
Attali, Yigal, Burstein, Jill; Automated Essay Scoring with E-Rater, V.2; Journal of Technology, Learning, and Assessment, 4(3); 2006.
Attali, Yigal, Lewis, Will, Steier, Michael; Scoring with the Computer: Alternative Procedures for Improving Reliability of Holistic Essay Scoring; Language Testing, 30(1); pp: 125-141; 2013.
Baayen, Herald; Word Frequency Distributions; Kluwer: Dordrecht; 2001.
Baronl, Marco, Evert, Stefan; Words and Echoes: Assessing and Mitigating the Non-Randomness Problem in Word Frequency Distribution Modeling; In Proceedings of the 45th Annual Meeting of the Association for Computational Linguistics; Prague, Czech Republic; pp. 904-911; 2007.
Baronl, Marco, Lenci, Alessandro; Distributional Memory: A General Framework for Corpus-Based Semantics; Computational Linguistics, 36(4); pp. 673-721; 2010.

Barzilay, Regina, Elhadad, Michael; Using Lexical Chains for Text Summarization; In Proceedings of the Association for Computational Linguistics—Intelligent Scalable Text Summarization Workshop; 1997.
Barzilay, Regina, Lapata, Mirella; Modeling Local Coherence: An Entity-based Approach; Proceedings of the 43rd Annual Meeting of the Association for Computational Linguistics; pp. 141-148; 2005.
Beigman Klebanov, Beata, Flor, Michael; Word Association Profiles and Their Use for Automated Scoring of Essays; Proceedings of the 51st Annual Meeting of the Association for Computational Linguistics; pp. 1148-1158; 2013.
Beigman Klebanov, Beata, Shamir, Eli; Reader-based Exploration of Lexical Cohesion; Language Resources and Evaluation, 40(2); pp. 109-126; 2006.
Berman, Antoine; Translation and the Trials of the Foreign (translated from 1985 French original by L. Venuti); In L. Venuti, Ed., The Translation Studies Reader; Routledge: New York; pp. 276-289; 2000.
Biemann, Chris, Choudhury, Monojit, Mukherjee, Animesh; Syntax is from Mars While Semantics is from Venus: Insights from Spectral Analysis of Distributional Similarity Networks; In Proceedings of the ACL-IJCNLP 2009 Conference Short Papers; Stroudsburgh, PA; pp. 245-248; 2009.
Blei, David, Lafferty, John; Dynamic Topic Models; In Proceedings of the 23rd International Conference on Machine Learning; New York, NY; pp. 113-120; 2006.
Blei, David, Ng, Andrew, Jordan, Michael; Latent Dirichlet Allocation; The Journal of Machine Learning Research, 3; pp. 993-1022; 2003.
Bouma, Gerlof; Normalized (Pointwise) Mutual Information in Collocation Extraction; From Form to Meaning: Processing Texts Automatically; Proceedings of the Biennial GSCL Conference; pp. 31-40; 2009.
Brants, Thorsten, Franz, Alex; Web 1T 5-gram Version 1; LDC2006T13, Linguistic Data Consortium; 2006.
Budanitsky, Alexander, Hirst, Graeme; Evaluating WordNet-based Measures of Lexical Semantic Relatedness; Computational Linguistics, 32(1); pp. 13-47; 2006.
Bullinaria, John, Levy, Joseph; Extracting Semantic Representations From Word Co-occurence Statistics: A Computational Study; Behavior Research Methods, 39; pp. 510-526; 2007.
Chall, Jeanne, Bissex, Glenda, Conard, Sue, Harris-Sharpless, Susan; Qualitative Assessment of Text Difficulty: A Practical Guide for Teachers and Writers; Brookline Books: Cambridge, MA; 1996.
Chall, Jeanne; Varying Approaches to Readability Measurement; Revue quebecoise de linguistique, 25(1); pp. 23-40; 1996.
Chall, Jeanne, Dale, Edgar; Readability Revisited: The New Dale-Chall Readability Formula; Brookline Books: Cambridge, MA; 1995.
Church, Kenneth, Hanks, Patrick; Word Association Norms, Mutual Information, and Lexicography; Computational Linguistics, 16(1); pp. 22-29; 1990.
Coleman, Men, Liau, T.L.; A Computer Readability Formula Designed for Machine Scoring; Journal of Applied Psychology, 60(2); pp. 283-284; 1975.
Common Core State Standards Initiative (CCSSI); English Language Arts Standards; http://www.corestandards.org/ELA-Literacy; 2013.
Crossley, Scott, Greenfield, Jerry, McNamara, Danielle; Assessing Text Readability Using Cognitively Based Indices; TESOL Quarterly, 42(3); pp. 475-493; 2008.
Davies, Nicola; Bat Loves the Night; Candlewick: Cambridge, MA; 2001.
Devitt, Ann, Ahmad, Khurshid; Sentiment Polarity Identification in Financial News: A Cohesion-Based Approach; In Proceedings of the 45th Annual Meeting of the Association for Computational Linguistics; Prague, Czech Republic; pp. 984-991; 2007.
DuBay, William; The Principles of Readability; Impact Information: Costa Mesa, CA; 2004.
Ercan, Gonenc, Cicekli, Ilyas; Using Lexical Chains for Keyword Extraction; Information Processing & Management, 43(6); pp. 1705-1714; 2007.

(56) References Cited

OTHER PUBLICATIONS

Evert, Stefan; Corpora and Collocations; Article 58, In A. Ludeling and M. Kyto, Eds., Corpus Linguistics: An International Handbook; Mouton de Gruyter: Berlin; 2008.

Feng, Lijun, Jansche, Martin, Huenerfauth, Matt, Elhadad, Noemie; A Comparison of Features for Automatic Readability Assessment; Coling 2010: Poster Volume, Beijing; pp. 276-284; 2010.

Flesch, Rudolph; A New Readability Yardstick; Journal of Applied Psychology, 32(3); pp. 221-233; 1948.

Flor, Michael; A Fast and Flexible Architecture for Very Large Word N-Gram Datasets; Natural Language Engineering, 19(1); pp. 61-93; 2013.

Foltz, Peter, Kintsch, Walter, Landauer, Thomas; The Measurement of Textual Coherence with Latent Semantic Analysis; Discourse Processes, 25(2-3); pp. 285-307; 1998.

Fountas, Irene, Pinnell, Gay Su; Guiding Readers and Writers, Grades 3-6; Heinemann: Portsmouth, NH; 2001.

Freebody, Peter, Anderson, Richard; Effects of Vocabulary Difficulty, Text Cohesion, and Schema Availability on Reading Comprehension; Technical Report No. 225, Center for the Study of Reading, University of Illinois at Urbana-Champaign; 1981.

Graesser, Arthur, McNamara, Danielle, Kulikowich, Jonna; Coh-Metrix: Providing Multilevel Analyses of Text Characteristics; Educational Researcher, 40(5); pp. 223-234; 2011.

Graesser, Arthur, McNamara, Danielle, Louwerse, Max, Cai, Zhiqiang; Coh-Metrix: Analysis of Text on Cohesion and Language; Behavioral Research, Methods, Instruments and Computers, 36(2); pp. 193-202; 2004.

Graff, David, Cieri, Christopher; English Gigaword LDC2003T05; Linguistic Data Consortium; Philadelphia, PA; 2003.

Green, Stephen; Automated Link Generation: Can We Do Better Than Term Repetition?; Computer Networks, 30; pp. 75-84; 1998.

Grosz, Barbara, Joshi, Aravind, Weinstein, Scott; Centering: A Framework for Modeling the Local Coherence of Discourse; Association for Computational Linguistics, 21(2); pp. 203-226; 1995.

Guinaudeau, Camille, Gravier, Guillaume, Sebillot, Pascale; Enhancing Lexical Cohesion Measure with Confidence Measures, Semantic Relations and Language Model Interpolation for Multimedia Spoken Content Topic Segmentation; Computer Speech and Language, 26(2); pp. 90-104; 2012.

Gunning, Robert; The Technique of Clear Writing; McGraw-Hill International Book Co.: New York; 1952.

Gurevych, Iryna, Strube, Michael; Semantic Similarity Applied to Spoken Dialogue Summarization; In Proceedings of COLING 2004, Geneva, Switzerland; pp. 764-770; 2004.

Halliday, Michael, Hasan, Ruqaiya; Cohesion in English; Longman: London; 1976.

HaveFunTeaching.com; http://havefunteaching.com; 2013.

Heilman, Michael, Madnani, Nitin; Topical Trends in a Corpus of Persuasive Writing; Technical Report ETS-RR-12-19; Educational Testing Service; 2012.

Heilman, Michael, Collins-Thompson, Kevyn, Callan, Jamie, Eskenazi, Maxine; Classroom Success of an Intelligent Tutoring System for Lexical Practice and Reading Comprehension; Proceedings of the 9th International Conference on Spoken Language Processing, Pittsburgh, PA; 2006.

Hiebert, Elfrieda; Using Multiple Sources of Information in Establishing Text Complexity; Text Project, Inc., Reading Research Report #11.03; 2011.

Hiebert, Elfrieda; Text Project; http://textproject.org; 2013.

Bamberg, Betty; What Makes Text Coherent?; College Composition and Communication, 34(4); pp. 417-429; Dec. 1983.

Foltz, Peter; Discourse Coherence and LSA; In T. Landauer, D. McNamara, S. Dennis, & W. Kintsch (Eds.), Handbook of Latent Semantic Analysis; Erlbaum: Mahwah, NJ; pp. 167-184; 2007.

Halliday, Michael, Matthiessen, Christian; An Introduction to Functional Grammar, 3d Edition; Arnold: London; 2004.

Hoey, Michael; Lexical Priming: A New Theory of Words and Language ; Routledge: London, UK; 2005.

Tierney, Robert, Mosenthal, James; Cohesion and Textual Coherence; Research in the Teaching of English, 17(3); pp. 215-229; Oct. 1983.

\* cited by examiner

| "the dog barked and wagged its tail" | | | | |
|---|---|---|---|---|
| | dog | barked | wagged | tail |
| dog | | 7.02 | 7.64 | 5.57 |
| barked | | | 9.18 | 5.95 |
| wagged | | | | 9.45 |
| tail | | | | |

Figure 2A

| "green ideas sleep furiously" | | | | |
|---|---|---|---|---|
| | green | ideas | sleep | furiously |
| Green | | 0.44 | 1.47 | 2.05 |
| Ideas | | | 1.01 | 0.94 |
| Sleep | | | | 2.18 |
| Furiously | | | | |

Figure 2B

SYSTEMS AND METHODS FOR DETERMINING TEXT COMPLEXITY

Applicant claims benefit pursuant to 35 U.S.C. § 119 and hereby incorporates by reference the following U.S. Provisional Patent Applications: "Lexical Tightness: A Measure of Co-Selection of Words in a Text," App. No. 61/765,113, filed Feb. 15, 2013; "Lexical Tightness and Text Complexity," App. No. 61/774,662, filed Mar. 8, 2013; and "Associative Lexical Cohesion as a Factor in Text Complexity," App. No. 61/839,537, filed Jun. 26, 2013.

FIELD

The technology described herein relates generally to language complexity analysis and more specifically to automated scoring of essays and determining reading-levels of documents.

BACKGROUND

Estimation of readability and document complexity or sophistication is often performed in education and in other domains. Such a situation may occur, for example, where a student or applicant's essay is being scored, or if a document's suitable reading-level (e.g., by school grade level or age) is being determined. These types of determinations are typically performed manually, which are often costly, time-consuming, and lack objectivity. The problem is further exacerbated where the number of documents that need to be analyzed is large.

SUMMARY

In accordance with the teachings herein, computer-implemented systems and methods are provided for determining a document's complexity. For example, a computer performing the complexity analysis can receive a document. The computer can determine the content words within the document and determine an association measure for each group of content words. An association profile can be created for the document using the association measures. The computer can use the association profile to determine the complexity of the document. The complexity of the document may correspond to the document's suitable reading level or, if the document is an essay, an essay score.

BRIEF DESCRIPTION OF THE DRAWINGS

FIGS. 2A and 2B depict two example phrases and PMI values computed for their respective content word pairs.

DETAILED DESCRIPTION

One way to estimate the complexity of a document is by analyzing the co-occurrence behavior of words in the document. For example, in the phrase, "the dog barked and wagged its tail," each pair of words (e.g., "dog" and "bark," or "dog" and "tail") is often used together in the English language, which may indicate that the phrase is fairly simple. In contrast, each pair of words in the phrase, "green ideas sleep furiously," is rarely used together, which may indicate that the phrase is more complex or sophisticated.

Here, the term "co-occurrence" refers to the non-positional joint occurrence of words in a body of text (e.g., two words occurring anywhere within a given window of text). For example, certain words in English, such as "dog" and "bark", may commonly co-occur in the same document, whereas "green" and "ideas" may rarely be seen in the same document. Words that more commonly co-occur are referred to as being more "associated" with one another. Note that while the examples given are of the English language, the described invention may be applied to documents in other languages as well.

Figure 1:
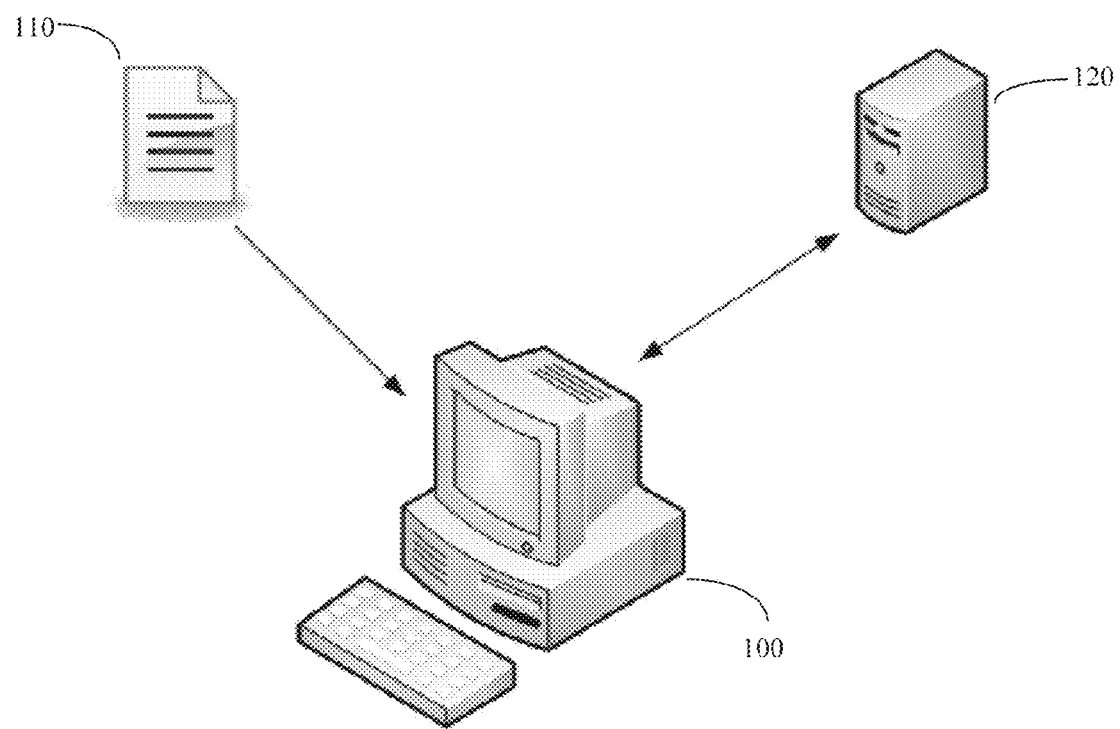
FIG. 1 depicts a computer-implemented environment for determining a document's complexity.

FIG. 1 depicts a computer-implemented environment for providing document complexity analysis. A computer 100 with the necessary software for performing the complexity analysis receives a document 110 to be analyzed. The document 110 may be a book, article, essay, publication, story, or any other written work. The document 110 may also be the data representation of a speech or verbal presentation. Based on the co-occurrences of select words in the document 110, the computer 100 queries a server or database 120 to determine the numeric value of association between those words.

The server or database 120 may store co-occurrence data collected from a large body of written text. In one embodiment, the server or database 120 stores co-occurrence data of word pairs in the form of a two-dimensional matrix, where each row and each column represents a word found in the body of written text. The matrix element $A_{i,j}$ represents the frequency of the word represented by the i row and the word represented by the j column co-occurring in the same document.

Using the co-occurrence data matrix, the computer 100 or server 120 may calculate an association measure (i.e., a measure of the extent to which words co-occur more or less than chance) for each pair of words. In one embodiment, the association measure is defined by the following Point-wise Mutual Information (hereinafter "PMI") formula:

$$PMI(a, b) = \log_2 \frac{p(a, b)}{p(a)p(b)},$$

where a and b each represent a word.

In another embodiment, the association measure may be defined by the following Normalized PMI (hereinafter "NPMI") formula:

$$NPMI(a, b) = \left(\log_2 \frac{p(a, b)}{p(a)p(b)}\right) \bigg/ -\log_2 p(a, b)$$

NPMI has the property that its values are mostly constrained in the range {−1, 1} and is less influenced by rare extreme values, which is convenient for summing values over multiple pairs of words.

Based on empirical data, it is further determined that in certain cases—such as assessing a document's reading level—ignoring the negative NPMI values improves correlation between the associated measures and the document's perceived complexity or sophistication. Thus, the Positive Normalized PMI (hereinafter "PNPMI") formula is defined as:

$$PNPMI(a, b) = \begin{cases} NPMI(a, b), \text{ if } NPMI(a, b) > 0 \\ 0, \text{ if } NPMI(a, b) \leq 0 \text{ or if database has no data for } a \text{ and } b \end{cases}$$

The PMI, NPMI, and PNPMI association measures are provided as examples only. Any one of these measures, as well as other measurements of the association between words (regardless of the number of words), may be used.

To illustrate the association measure being used to estimate language complexity, FIGS. 2A and 2B show the PMI association measures for the two phrases previously discussed. FIG. 2A represents the phrase, "the dog barked and wagged its tail." The words that provide content within this phrase are "dog," "barked," "wagged," and "tail." The matrix shown in FIG. 2A summarizes the PMI value for each pair-wise combination of those four words, computed from the co-occurrence data stored in the database or server 120. For example, the PMI value for "dog" and "barked" co-occurring is 7.02, and the PMI value for "wagged" and "tail" co-occurring is 9.45. Similarly, FIG. 2B represents the phrase, "green ideas sleep furiously." Each of the four words in this phrase provides content and is featured in the matrix shown in FIG. 2B. The matrix summarizes the PMI value for each pair-wise combination of those four words. For example, the PMI value for "green" and "ideas" co-occurring is 0.44.

As shown by the matrices, the PMI values of the six word pairs in FIG. 2A all fall within a range of 5.57 to 9.45, whereas the PMI values in FIG. 2B fall within a range of 0.44 to 2.18. The relatively higher PMI values in FIG. 2A as compared to that of FIG. 2B suggests that the words in the first phrase ("the dog barked and wagged its tail") are more often used together in English than the words in the second phrase ("green ideas sleep furiously"). This is one factor that makes the first phrase seem easier to understand than the seemingly more complex second phrase.

The association values of groups of words (e.g., pairs, triples, quads, etc.) within a document may be used to generate a profile for the document, which in turn can be used to quantify the complexity of the document. In one embodiment, a Word Association Profile of a document d (hereinafter "$WAP_d$") is defined as the distribution of association measures for all pairs of content words in that document, where the association measures are estimated from a large corpus of documents. If a pair of content words has never been observed in the same document (or segment of the document), then it is excluded from $WAP_d$. In one embodiment, content words are common and proper nouns, verbs, adjectives, and adverbs. In another embodiment, a stop-list is further applied to filter out auxiliary verbs and certain words that sometimes function as adverbs but are often prepositions or particles.

Figure 3:
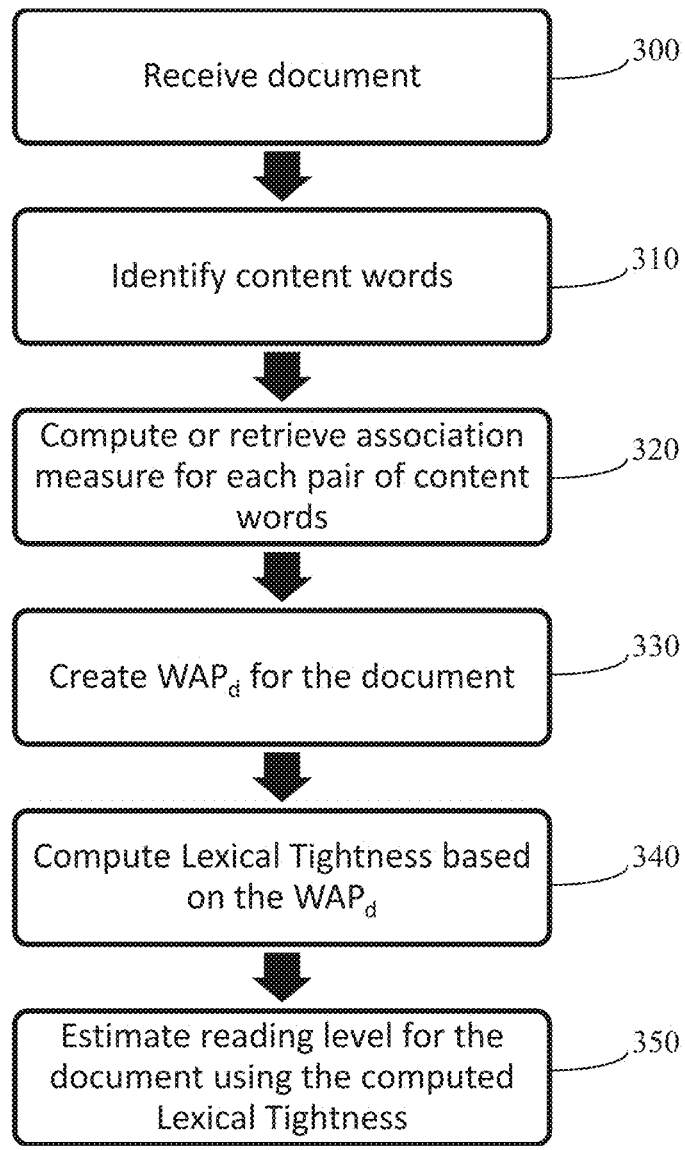
FIG. 3 is a flow diagram depicting a computer-implemented method of determining a document's complexity.

FIG. 3 is a flow diagram showing one embodiment of the invention as applied to an automatic method for determining the suitable reading level of a document (e.g., first- to twelfth-grade level). A computer making the reading-level determination receives the document to be analyzed at 300. The document could be in any format, such as digital text. In another embodiment, the text document may be converted from a scanned image of a body of text or from an audio or video input.

At 310, the computer identifies the content words within the document. As indicated above, the content words may be limited to nouns, verbs (excluding auxiliary verbs), adjectives, and adverbs. Other filters may also be applied to refine the list of content words (e.g., removing duplicates). In one embodiment, the tagging of content word tokens may be performed by a tagging tool.

At 320, the computer determines an association measure for each pair of content words co-occurring in the same document. As discussed above, the strength of the association may be quantified by the pair's PMI, NPMI, PNPMI, or other association measures. The computation (or pre-computation) of the association values may be performed by the computer or by a remote server.

Figure 4:
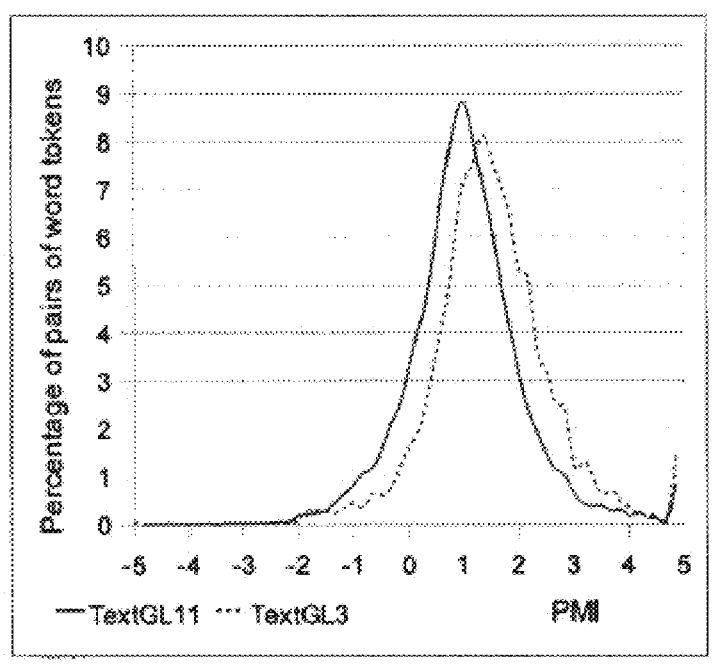
FIG. 4 is a chart showing the Word Association Profiles of a third-grade level document and an eleventh-grade level document.

At 330, the collection of association values for all pairs of content words in the document is used to create the $WAP_d$ for the document. The $WAP_d$ may contain hundreds of data points, which could be represented by a histogram. Each bin of the histogram represents the number of word pairs having association values falling within a certain association value interval. For example, the histogram may have 60 bins spanning all obtained PMI values (if PMI is used as the association measure). The lowest bin may contain word pairs with PMI≤−5; the top-most bin may contain word pairs with PMI>4.83; and the rest of the bins may contain word pairs with PMI between −5 and 4.83 (the bins may evenly represent this interval or adopt a more sophisticated gridding approach known in the art). FIG. 4 shows the WAP histograms for two sample real documents—one deemed suitable for third-grade students (or age 8-9, represented by the GL3 curve) and the other for eleventh-grade students (or age 16-17, represented by the GL11 curve). The distribution of the GL3 histogram is shifted to the right of the GL11 histogram, which indicates that third-grade level text contains more highly associated word pairs than the eleventh-grade level text. The normal-like shape of the histogram distribution is observed across a variety of documents.

In one embodiment, the $WAP_d$ histogram may be normalized by dividing the number of word pairs in each bin by the total number of word pairs in the document, so that the $WAP_d$ profile includes the proportion of word pairs that fall into each bin. This is done in order to enable comparisons across texts of different lengths.

At 340, the average (mean) value of all association values of the document's content words is computed. This is termed Lexical Tightness, which represents the degree to which a document tends to use words that are highly inter-associated in the language. It describes vocabulary selection for a text and the sequencing of the words and word repetitions.

At 350, the Lexical Tightness of the document is used to estimate a suitable reading level for the document. Based on empirical studies, Lexical Tightness has considerable statistical correlation with reading level. Specifically, Lexical Tightness is inversely correlated with reading level (i.e., the higher the Lexical Tightness of a text, the lower the reading level). Moreover, based on empirical studies, Lexical Tightness is more strongly correlated with the reading level of literary texts (e.g., fiction) than for informational texts (e.g., encyclopedia). To determine the Lexical Tightness range for a specific reading level, the Lexical Tightness values of documents known to be suitable for that reading level may be computed. The computed results may then serve as a bench mark for documents with unknown reading levels.

In addition to being used independently, Lexical Tightness may also be used with other readability indexes to improve the combined predictive effectiveness. For example, Lexical Tightness may be used with the Flesch-Kincaid Grade Level index (hereinafter "FKGL"), which is based on measuring the average length of words and length of sentences, to estimate reading level. Using a linear regression model with reading-level as a dependent variable and FKGL score with Lexical Tightness as the two independent variables, it is shown that Lexical Tightness improves the predictive effectiveness of FKGL. The result of the regression model on 1012 texts indicates that the amount of explained variance in the reading level, as measured by the $R^2$ of the model, improved from 0.497 (with FKGL alone, r=0.705) to 0.564 (FKGL with Lexical Tightness, r=0.752), which is an improvement of 6.7%.

The above described method for estimating reading levels may also be applied to poetry and prose. To address the significance of recurring words in poetry or prose, the association measure may be alternatively defined as follows:

$$RAS(a, b) = \begin{cases} 1.0, \text{ if } a = b \text{ (token repetition)} \\ 0.9, \text{ if } a \text{ and } b \text{ are inflectional variants of same lemma} \\ PNPMI(a, b), \text{ otherwise} \end{cases}$$

RAS is short for "Revised Association Score," and Revised Lexical Tightness (hereinafter "LTR") for a document is the average of RAS scores for all content word pairs in the document. The LTR may be used alone or with other readability indexes (such as Flesch Reading Ease, which is a based on measuring average lengths of words and sentences) to estimate the reading level for poetry or prose.

Lexical Tightness may also be applied to segments of different sizes in a document to predict the document's reading level. For example, rather than computing Lexical Tightness for all pairs of content words within a document, Lexical Tightness may be computed for only those pairs of content words belonging to the same paragraph (hereinafter "within-paragraph" or "WP"), for every paragraph in the document. In another embodiment, Lexical Tightness may be computed for only those pairs of content words belonging to the same sentence (hereinafter "within-sentence" or "WS"), for every sentence in the document. In another embodiment, Lexical Tightness may be computed for only those pairs of content words belonging to a sliding window of X words (e.g., 10, 20, etc.) (hereinafter "within-[X]-sliding-window" or "W[X]", where [X] is replaced by the number of words in the sliding window). The sliding window counts any word in the text, not just content words, but only content words are used in the Lexical Tightness computation. The sliding window is not reset on sentence or paragraph breaks.

Figure 5:
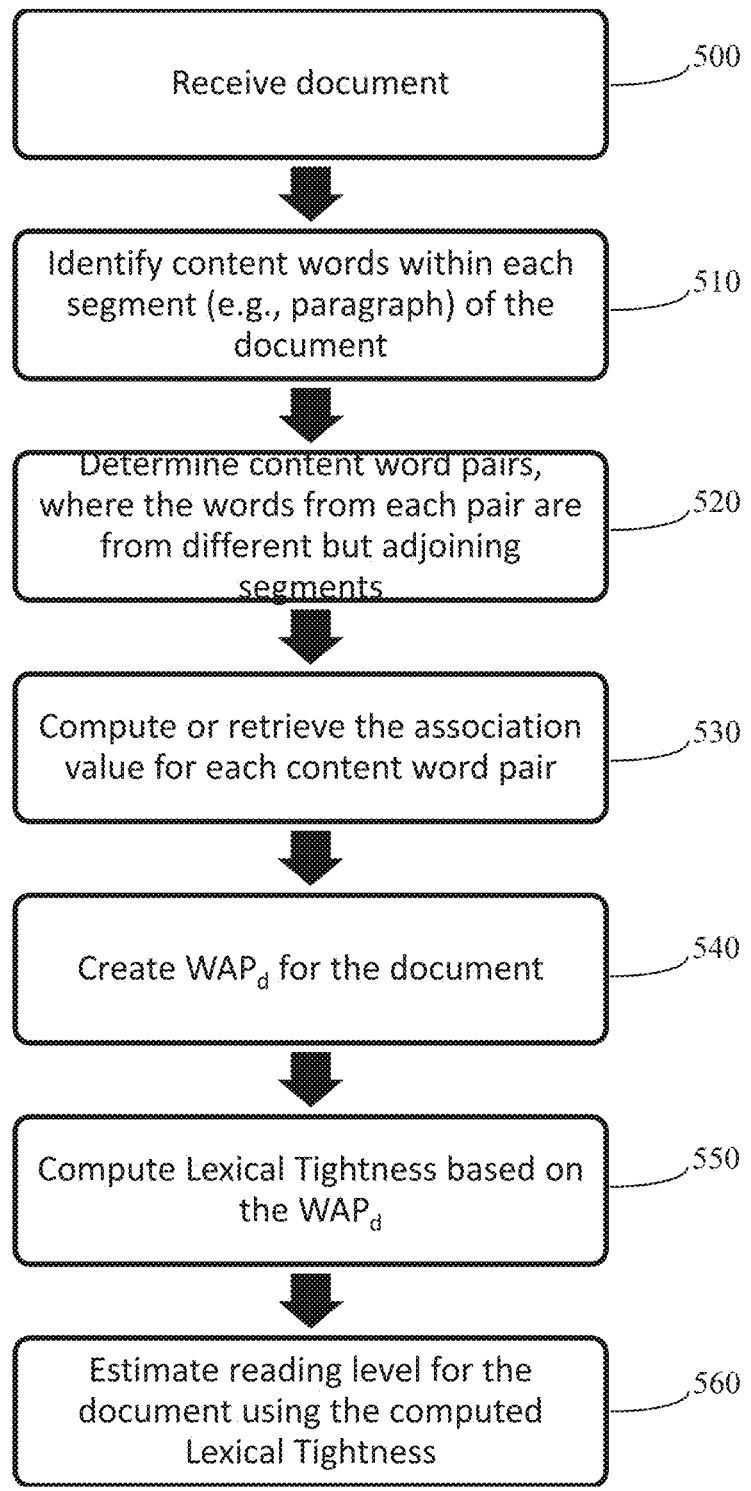
FIG. 5 is a flow diagram depicting a computer-implemented method of determining a document's complexity, where content word pairs are taken from different but adjoining document segments.

FIG. 5 shows an embodiment where Lexical Tightness is measured between adjacent segments (e.g., sentences or paragraphs). At 500, the computer performing the computation receives a document to be analyzed. At 510, each segment is processed separately to identify the content words therein. At 520, all pairs of content words (which may be represented by a matrix) are determined, where each pair includes content words from different but adjoining segments (e.g., a pair may include a content word from the fifth paragraph and a second word from the sixth paragraph of the document). At 530, the association value (e.g., PNPMI) for each identified pair of content words is determined. The association values are then used to create a $WAP_d$ profile for the document (at 540), which is then used to calculate the Lexical Tightness of the document by taking the average of the association values (at 550). At 560, the Lexical Tightness may then be used to estimate the document's reading level Empirical data has shown that Lexical Tightness computed at various segments is quite robust in its correlation with reading level. This is the case despite the drastic reduction in the number of pairs of content words used in the calculation as compared to the number of pairs within the entire document (i.e., without segmentation). In an example, the number of pairs used in the within-paragraph (or WP) embodiment is on average 15.5% of the number of pairs used in the within-document embodiment.

The $WAP_d$ profile allows both coarse-grained and fine-grained assessment of document complexity as it provides rich representation of the associative behaviors of word pairs of which the document is made. The foregoing discussion of $WAP_d$ being used to determine a document's reading level may be considered coarse-grained, since the difference in document complexity between reading grade levels (e.g., between 1st to 12th grade) may be significant. But even for documents that are roughly within the same complexity range (e.g., post-$12^{th}$ grade level), $WAP_d$ may be used to measure the subtle sophistication differences between those documents.

In one embodiment, the $WAP_d$ profile may be used to quantify differences between well written and poorly written college-entrance essays, for the purpose of automating essay scoring. To determine the $WAP_d$ characteristics of a well written essay (as compared to a poorly written essay), $WAP_d$ is computed for essays written in response to six essay prompts (referred to as p1 to p6), with roughly 1000 essays per prompt. Each essay was scored by 1~4 human scorers and the average of the scores is taken to represent the score for that essay.

The $WAP_d$ distributions can then be compared with the known essay scores to identify PMI ranges that correlate well with the human-determined scores. Each essay's $WAP_d$ may be represented by a histogram of 60 bins, where each bin represents the number of content word pairs with PMI values that fall within a particular PMI range. The correlation between essay score and the proportion of word pairs in each of the 60 bins of the WAP histogram is then separately calculated for each of the essay prompts p1-p6. Based on the correlation computations, it is observed that high PMI values (such as $2.67 \leq PMI \leq 3.83$) are significantly correlated with the human-determined essay scores. It may also be that low PMI values (such as $-2 < PMI < 0$) are also correlated with the human-determined essay scores. One potential explanation for these observations is that the higher proportion of high PMI values may indicate more topic development and a higher proportion of negative PMI values may indicate more creative use of language, both of which may be characteristics of better essays. These ranges of PMI values, as well as other ranges of PMI values that may also correlate (either positively or negatively) well with the scores, may then be used to estimate an essay's score or to improve another automated essay scoring method known in the art.

Figure 6:
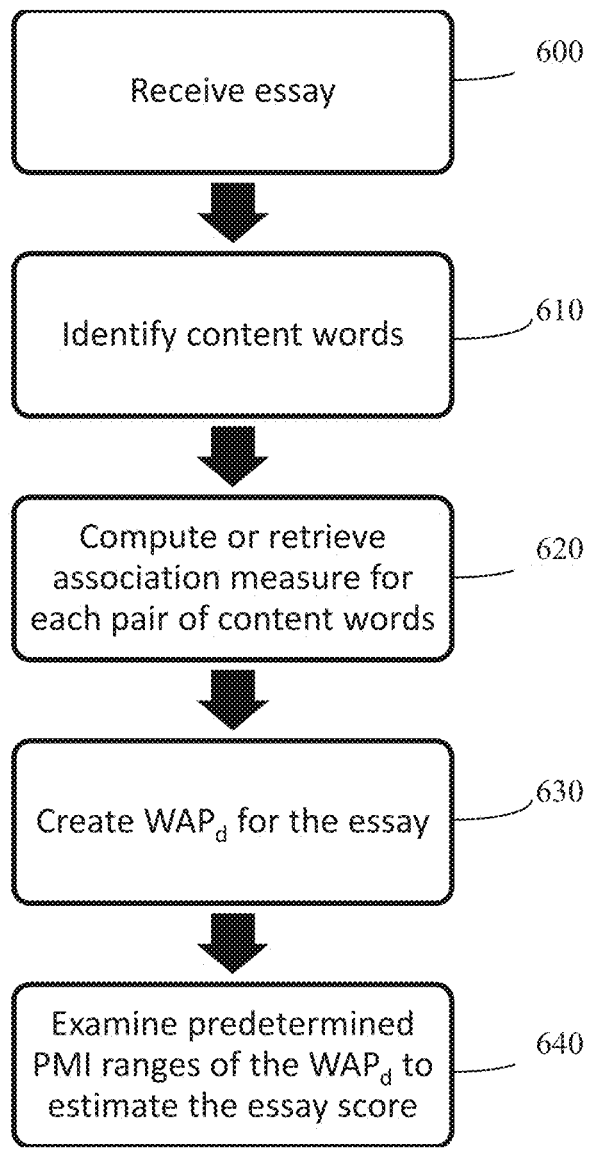
FIG. 6 is a flow diagram depicting a computer-implemented method of automatically determining an essay's score.

FIG. 6 is a flow chart depicting an embodiment for automatically scoring an essay. At 600, the computer receives the essay to be scored. At 610, the content words of the essay are identified. In one embodiment, duplicate content words may be filtered out. At 620, the computer determines all pairs of content words and either compute or retrieve their associated PMI values. At 630, the PMI values are used to create a $WAP_d$ profile for the essay. Then at 640, particular predetermined ranges of the $WAP_d$ distribution are examined to estimate the essay's score. For example, for the types of essays represented by p1-p6 above, the range of PMI of interest may be between $2.67 \leq PMI \leq 3.83$ and $-2 < PMI < 0$. In one embodiment, an essay's score may be determined by computing the proportion of content word pairs in the essay that fall within those ranges. The higher the proportion, the higher the score.

Figure 7A:
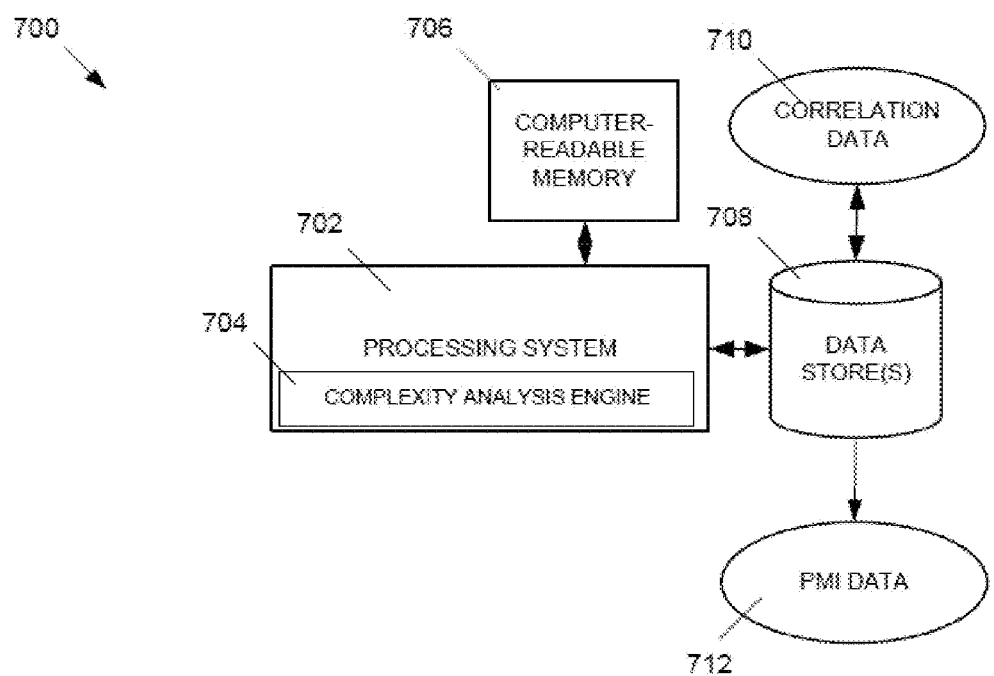
FIGS. 7A, 7B, and 7C depict example systems for use in implementing a document complexity analysis engine.
Figure 7B:
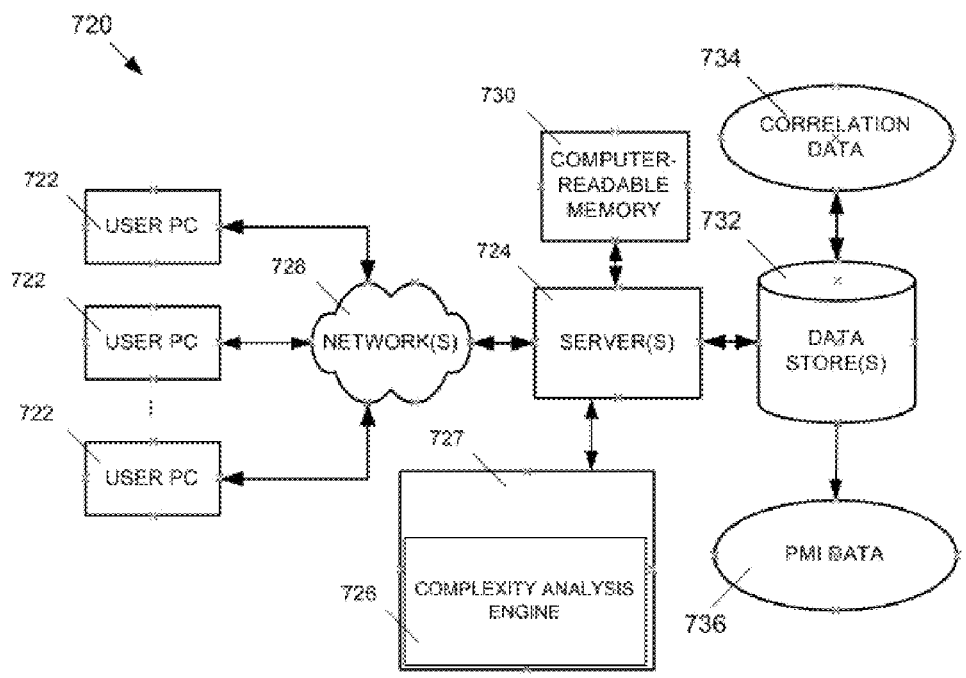
Figure 7C:
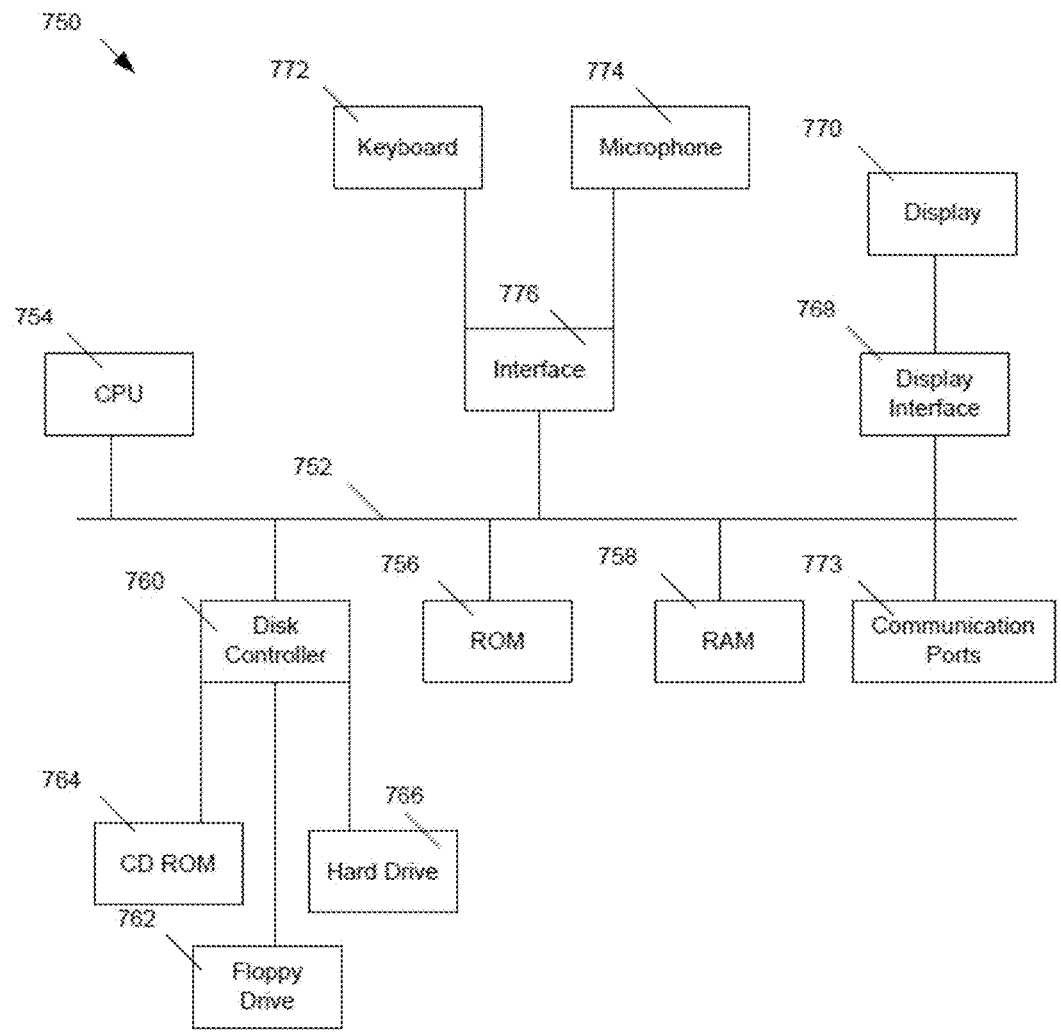

FIGS. 7A, 7B, and 7C depict example systems for use in implementing an automated document complexity analysis engine. For example, FIG. 7A depicts an exemplary system 700 that includes a stand-alone computer architecture where a processing system 702 (e.g., one or more computer processors) includes a complexity analysis engine 704 (which may be implemented as software). The processing system 702 has access to a computer-readable memory 706 in addition to one or more data stores 708. The one or more data stores 708 may contain correlation data 710 as well as pre-computed PMI data 712.

FIG. 7B depicts a system 720 that includes a client server architecture. One or more user PCs 722 accesses one or more servers 724 running a document complexity analysis engine 726 on a processing system 727 via one or more networks 728. The one or more servers 724 may access a computer readable memory 730 as well as one or more data stores 732. The one or more data stores 732 may contain correlation data 734 as well as pre-computed PMI data 736.

FIG. 7C shows a block diagram of exemplary hardware for a standalone computer architecture 750, such as the architecture depicted in FIG. 7A, that may be used to contain and/or implement the program instructions of exemplary embodiments. A bus 752 may serve as the information highway interconnecting the other illustrated components of the hardware. A processing system 754 labeled CPU (central processing unit) (e.g., one or more computer processors), may perform calculations and logic operations required to execute a program. A computer-readable storage medium, such as read only memory (ROM) 756 and random access memory (RAM) 758, may be in communication with the processing unit 754 and may contain one or more programming instructions for performing the method of implementing a document complexity analysis engine. Optionally, program instructions may be stored on a non-transitory computer readable storage medium such as a magnetic disk, optical disk, recordable memory device, flash memory, RAM, ROM, or other physical storage medium. Computer instructions may also be communicated via a communications signal, or a modulated carrier wave and then stored on a non-transitory computer-readable storage medium.

A disk controller 760 interfaces one or more optional disk drives to the system bus 752. These disk drives may be external or internal floppy disk drives such as 762, external or internal CD-ROM, CD-R, CD-RW or DVD drives such as 764, or external or internal hard drives 766. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 760, the ROM 756 and/or the RAM 758. Preferably, the processor 754 may access each component as required.

A display interface 768 may permit information from the bus 752 to be displayed on a display 770 in audio, graphic, or alphanumeric format. Communication with external devices may optionally occur using various communication ports 773.

In addition to the standard computer-type components, the hardware may also include data input devices, such as a keyboard 772, or other input device 774, such as a microphone, remote control, pointer, mouse and/or joystick.

The invention has been described with reference to particular exemplary embodiments. However, it will be readily apparent to those skilled in the art that it is possible to embody the invention in specific forms other than those of the exemplary embodiments described above. The embodiments are merely illustrative and should not be considered restrictive. The scope of the invention is reflected in the claims, rather than the preceding description, and all variations and equivalents which fall within the range of the claims are intended to be embraced therein.

It is claimed:

1. A computer-implemented method of analyzing complexity of a document, comprising:
    receiving the document with a processing system, the document including a plurality of words;
    identifying, with the processing system, content words within the document based on parts of speech for the plurality of words;
    selecting, with the processing system, a plurality of pairs of the content words that appear in a same sentence or paragraph to form multiple groups of content words;
    determining, with the processing system, an association measure for each group of content words by determining how often the pair of content words in each group appears in a same sentence or paragraph in a corpus of documents;
    creating, with the processing system, a word association profile, wherein the word association profile comprises a distribution of association measures for the multiple groups of content words in the document;
    determining, with the processing system, a complexity for the document based on the word association profile, wherein the document is an essay and the complexity is used to assess a quality of the essay.

2. The method of claim 1, wherein the document is a media file including spoken words.

3. The method of claim 1, wherein each of the parts of speech for the plurality of words is selected from the group consisting of noun, verb, adjective, and adverb.

4. The method of claim 1, wherein the content words are unique from one another.

5. The method of claim 1, wherein a group of content words includes exactly two content words.

6. The method of claim 1, wherein each group of content words includes only words occurring in a paragraph of the document.

7. The method of claim 1, wherein each group of content words includes only words occurring in a sentence of the document.

8. The method of claim 1, wherein each group of content words includes only words occurring within a predetermined window of words in the document.

9. A computer-implemented method of analyzing complexity of a document, comprising:
    receiving the document with a processing system, the document including a plurality of words;

identifying, with the processing system, content words within the document based on parts of speech for the plurality of words;
selecting, with the processing system, a plurality of pairs of the content words that appear in a same sentence or paragraph to form multiple groups of content words;
determining, with the processing system, an association measure for each group of content words by determining how often the pair of content words in each group appears in a same sentence or paragraph in a corpus of documents;
determining, with the processing system, a complexity score for the document based on the association measures determined for each group of content words, wherein determining the complexity of the document includes computing an average of the association measures included in the word association profile, wherein the average is inversely correlated to the complexity of the document.

10. The computer-implemented method of claim 9, wherein the complexity score of the document corresponds to a reading level of the document.

11. A computer-implemented method of analyzing complexity of a document, comprising:
receiving the document with a processing system, the document including a plurality of words;
identifying, with the processing system, content words within the document based on parts of speech for the plurality of words;
selecting, with the processing system, a plurality of pairs of the content words that appear in a same sentence or paragraph to form multiple groups of content words;
determining, with the processing system, an association measure for each group of content words by determining how often the pair of content words in each group appears in a same sentence or paragraph in a corpus of documents;
determining, with the processing system, a complexity for the document based on the association measures determined for each group of content words, wherein determining the complexity of the document includes using a readability index, wherein the readability index comprises Flesch-Kincaid Grade Level (FKGL) index, and wherein the complexity is used to estimate a reading level of the document.

12. A computer-implemented method of analyzing complexity of a document, comprising:
receiving the document with a processing system, the document including a plurality of words;
identifying, with the processing system, content words within the document based on parts of speech for the plurality of words;
selecting, with the processing system, a plurality of pairs of the content words that appear in a same sentence or paragraph to form multiple groups of content words;
determining, with the processing system, an association measure for each group of content words by determining how often the pair of content words in each group appears in a same sentence or paragraph in a corpus of documents;
determining, with the processing system, a complexity score for the document based on the association measures determined for each group of content words, wherein the document is poetry and the association measure is based on a Revised Association Score (RAS) formula.

13. A computer-implemented method of analyzing complexity of a document, comprising:
receiving the document with a processing system, the document including a plurality of words;
identifying, with the processing system, content words within the document based on parts of speech for the plurality of words;
selecting, with the processing system, a plurality of pairs of the content words that appear in a same sentence or paragraph to form multiple groups of content words;
determining, with the processing system, an association measure for each group of content words by determining how often the pair of content words in each group appears in a same sentence or paragraph in a corpus of documents;
determining, with the processing system, a complexity score for the document based on the association measures determined for each group of content words, wherein the document is an essay written by a student or applicant.

14. A computer-implemented method of analyzing complexity of a document,
receiving the document with a processing system, the document including a plurality of words;
identifying, with the processing system, content words within the document based on parts of speech for the plurality of words;
selecting, with the processing system, a plurality of pairs of the content words that appear in a same sentence or paragraph to form multiple groups of content words;
determining, with the processing system, an association measure for each group of content words by determining how often the pair of content words in each group appears in a same sentence or paragraph in a corpus of documents;
determining a proportion of the groups of content words having association measures that fall within one or more predetermined ranges;
determining, with the processing system, a complexity score for the document based on the proportion and a mean of the association measures determined for each group of content words, wherein the mean corresponds to lexical tightness, and
wherein the document is an essay and the complexity is used to assess a quality of the essay.

15. A system for analyzing complexity of a document, comprising:
a processing system; and
a memory, wherein the processing system is configured to execute steps comprising:
receiving the document with a processing system, the document including a plurality of words;
identifying, with the processing system, content words within the document based on parts of speech for the plurality of words;
selecting, with the processing system, a plurality of pairs of the content words that appear in a same sentence or paragraph to form multiple groups of content words;
determining, with the processing system, an association measure for each group of content words by determining how often the pair of content words in each group appears in a same sentence or paragraph in a corpus of documents;
creating, with the processing system, a word association profile, wherein the word association profile comprises a distribution of association measures for the multiple groups of content words in the document;

determining, with the processing system, a complexity for the document based on the distribution, wherein the document is an essay and the complexity is used to assess a quality of the essay.

16. A non-transitory computer readable medium comprising program instructions for analyzing complexity of a document, the instructions when executed causing a processing system to execute steps comprising:

receiving the document with a processing system, the document including a plurality of words;

identifying, with the processing system, content words within the document based on parts of speech for the plurality of words;

selecting, with the processing system, a plurality of pairs of the content words that appear in a same sentence or paragraph to form multiple groups of content words;

determining, with the processing system, an association measure for each group of content words by determining how often the pair of content words in each group appears in a same sentence or paragraph in a corpus of documents;

creating, with the processing system, a word association profile, wherein the word association profile comprises a distribution of association measures for the multiple groups of content words in the document;

determining, with the processing system, a complexity for the document based on the the distribution, wherein the document is an essay and the complexity is used to assess a quality of the essay.

17. A computer-implemented method of analyzing complexity of a document, comprising:

receiving the document with a processing system, the document including a plurality of words;

identifying, with the processing system, content words within the document based on parts of speech for the plurality of words;

selecting, with the processing system, a plurality of pairs of the content words that appear in a same sentence or paragraph to form multiple groups of content words;

determining, with the processing system, an association measure for each group of content words by determining how often the pair of content words in each group appears in a same sentence or paragraph in a corpus of documents, wherein the association measure is based on a formula selected from the group consisting of Point-wise Mutual Information (PMI), Normalized Point-wise Mutual Information (NPMI), Positive Normalized Point-wise Mutual Information (PNPMI), and Revised Association Score (RAS);

creating, with the processing system, a word association profile for the document based on the association measure for each group of content words; and determining, with the processing system, a complexity for the document based on the word association profile, wherein (i) the complexity is used to estimate a reading level of the document or (ii) the document is an essay and the complexity is used to assess a quality of the essay.

18. The computer-implemented method of claim 17, wherein the word association profile is represented by a histogram.

19. The computer-implemented method of claim 18, wherein the word association profile includes association measures for substantially all pairs of content words in the document.

20. The computer-implemented method of claim 18, wherein the word association profile is normalized.

* * * * *